United States Patent [19]

Kolb

[11] Patent Number: 4,840,419
[45] Date of Patent: Jun. 20, 1989

[54] TENSIONING ARRANGEMENT FOR THE TOP COVER OF A MOTOR VEHICLE

[75] Inventor: Eugen Kolb, Stuttgart, Fed. Rep. of Germany

[73] Assignee: Dr. Ing. h.c.F. Porsche Aktiengesellschaft, Stuttgart, Fed. Rep. of Germany

[21] Appl. No.: 198,445

[22] Filed: May 25, 1988

[30] Foreign Application Priority Data

May 29, 1987 [DE] Fed. Rep. of Germany ....... 3718093

[51] Int. Cl.$^4$ ............................................. B60J 7/12
[52] U.S. Cl. ................................ 296/108; 296/120.1; 296/122
[58] Field of Search ..................... 296/121, 122, 120.1, 296/116, 107, 108

[56] References Cited

U.S. PATENT DOCUMENTS

| | | | |
|---|---|---|---|
| 1,355,064 | 10/1920 | Ryder | 296/116 |
| 2,448,054 | 8/1948 | Seckel | 296/107 |
| 2,482,323 | 9/1949 | Cromwell et al. | 296/107 |
| 3,075,804 | 1/1963 | Geiger | 296/107 |
| 4,671,559 | 6/1987 | Kolb | 296/107 |
| 4,693,509 | 9/1987 | Moy et al. | 296/107 X |
| 4,747,635 | 5/1988 | Wagner | 296/107 |

FOREIGN PATENT DOCUMENTS

| | | | |
|---|---|---|---|
| 481111 | 8/1929 | Fed. Rep. of Germany | |
| 878309 | 6/1953 | Fed. Rep. of Germany | 296/116 |
| 753940 | 10/1933 | France | 296/107 |
| 241385 | 10/1925 | United Kingdom | 296/116 |
| 944518 | 12/1963 | United Kingdom | 296/107 |

Primary Examiner—Robert B. Reeves
Assistant Examiner—Brian Sells
Attorney, Agent, or Firm—Barnes & Thornburg

[57] ABSTRACT

A tensioning arrangement for a top cover of a motor vehicle includes a tensioning device arranged in loop-shaped longitudinal edges of the top cover which, on the one hand, is connected with a forward, transversely extending frame part and on the other with a pivotal support of the foldable top. In order to be able to compensate relatively great length changes of the top cover conditioned on weather and/or manufacture, the tensioning device of the tensioning arrangement cooperates at its one end with a tensioning spring and at its other end with a spring-loaded pivot lever, whereby a clamping bolt arranged at the pivot lever is supported in a closing position of the foldable top at a free end of a lateral longitudinal girder of the foldable top and tensions the tension spring by way of the tensioning device.

20 Claims, 3 Drawing Sheets

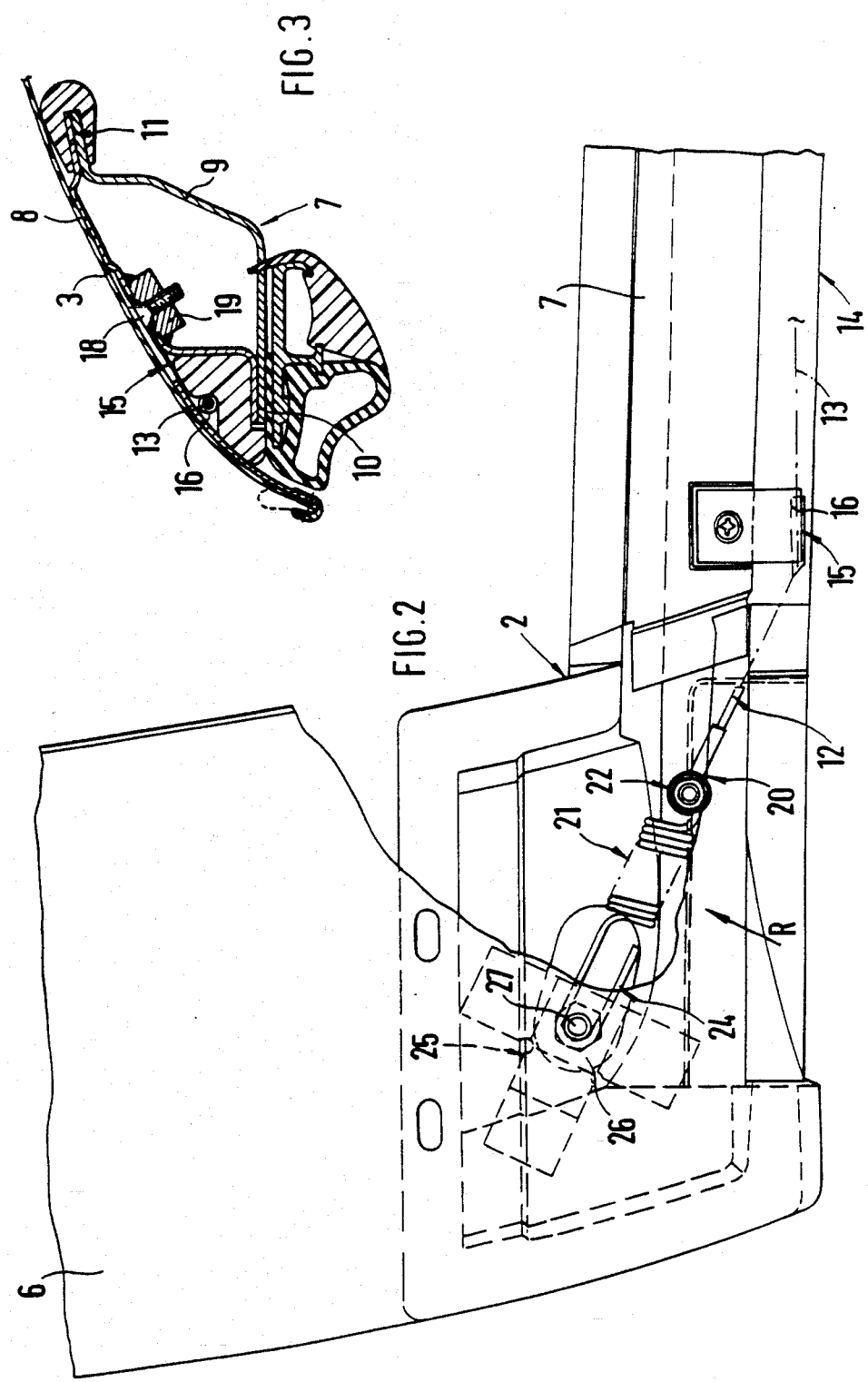

TENSIONING ARRANGEMENT FOR THE TOP COVER OF A MOTOR VEHICLE

BACKGROUND AND SUMMARY OF THE INVENTION

The present invention relates to a tensioning arrangement for the top cover of a motor vehicle, especially for a folding top, with a draw device extended through the loop-shaped longitudinal edges of the top cover, which is connected with a forward, transversely extending frame part and with a pivotal support of the foldable top.

A known tensioning arrangement of the aforementioned type is known from the DE-PS No. 481 111. In this arrangement, the draw device is connected directly with the transversely extending frame part and with the support adapted to be folded over so that only relatively small length changes of the top cover conditioned on manufacture and weather can be compensated.

It is the object of the present invention to so construct a tensioning arrangement for the top cover of a motor vehicle that relatively great length changes of the top cover conditioned on weather and manufacture can be compensated in a simple manner.

The underlying problems are solved according to the present invention in that the draw device cooperates at its one end with a draw spring and at its other end with a spring-loaded pivot lever whereby in a closed position of the foldable top a pressure bolt arranged at the pivot lever is supported at a free end of a lateral longitudinal girder of the foldable top and tensions or stresses the draw spring by way of the draw device. The principal advantages attained with the present invention reside in that by the cooperation of the draw device with a draw spring and with a spring-loaded pivot lever provided with a pressure bolt, an automatic tensioning of the top cover takes place during the closing operation of the foldable top and in that relatively great length changes of the top cover conditioned on weather and/or manufacture can be compensated by means of this tensioning arrangement. The tensioning arrangement is simple in construction and can be manufactured cost-favorably. Owing to the cooperation of the pressure bolt with the free end of the longitudinal girder, the pivot lever is displaced rearwardly during the closing operation and thus the draw device is tensioned which in turn tensions the draw spring and the top cover. The tensioning arrangement is so constructed that the cover material has its maximum tension in the closing position whereas during the opening of the foldable top, the top cover is untensioned or relieved.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 2 is a partial plan view on the foldable top and the tensioning arrangement in accordance with the present invention, on an enlarged scale;

FIG. 3 is a cross-sectional view taken along line III—III of FIG. 1, on an enlarged scale;

DETAILED DESCRIPTION OF THE DRAWINGS

Figure 1:
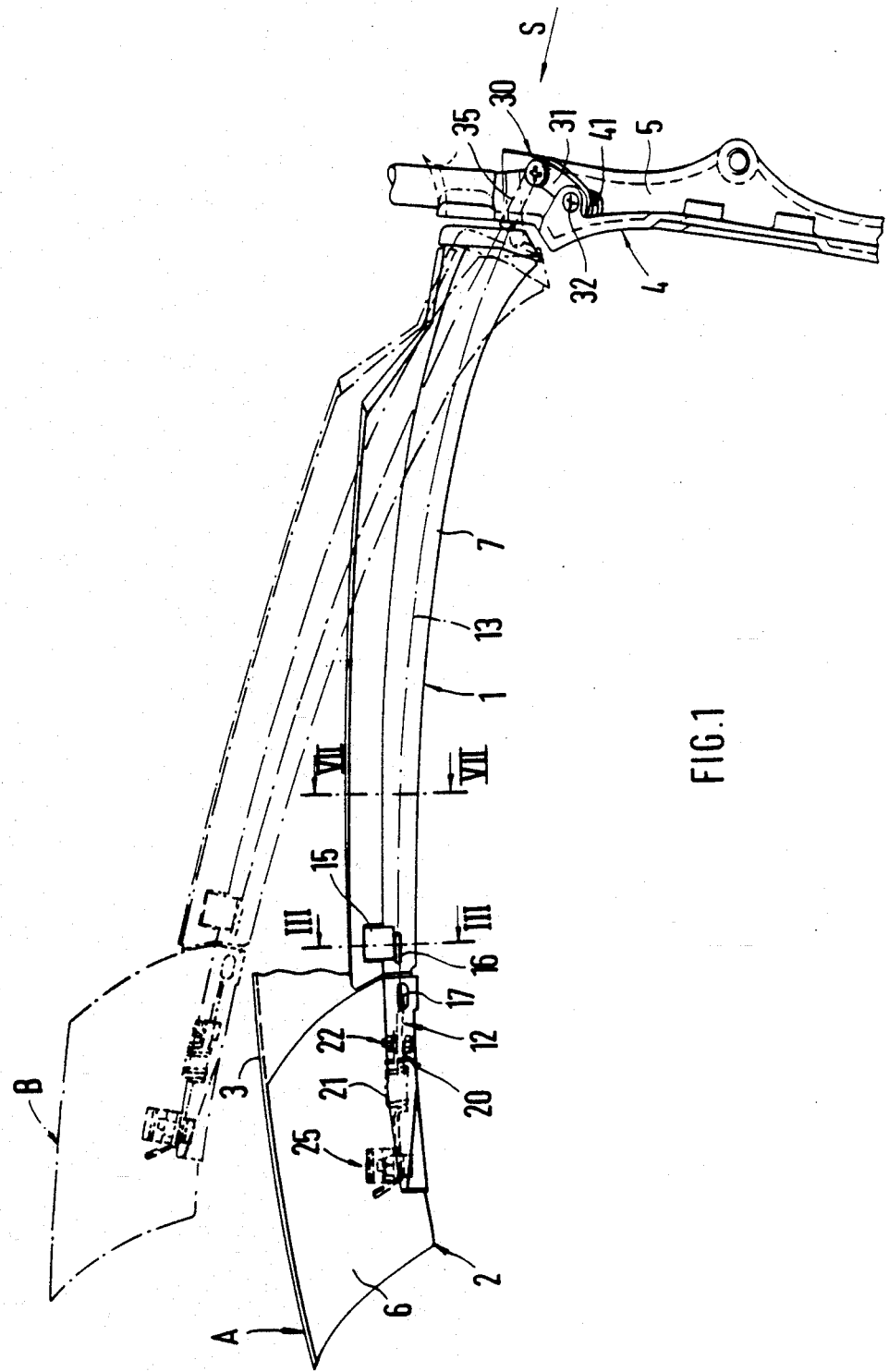
FIG. 1 is a partial side view of a foldable top with a tensioning arrangement for the top cover in accordance with the present invention.

Referring now to the drawing wherein like reference numerals are used throughout the various views to designate like parts, a foldable top generally designated by reference numeral 1 (FIG. 1) for a motor vehicle includes in the illustrated area a roof frame generally designated by reference numeral 2, a top cover 3 and a support 4 adapted to be folded over which is formed by a main support member 5 (FIG. 1) pivotally supported at the vehicle body lower part.

The roof frame 2 is composed of a transversely extending frame part 6 extending adjacent a windshield frame and of two lateral longitudinal girders 7 (FIG. 2). The undivided longitudinal girders 7 are connected with the main support member 5 disposed behind the same by way of a jointed lever system (not shown). Each longitudinal girder 7 consists of two profiled sheet metal stampings 8 and 9 (FIG. 3) which are securely connected with each other by welding at flanges 10 and 11 extending in the same direction and form a box-shaped hollow bearer (FIG. 3). Furthermore, one tensioning arrangement 12 each for the top cover 3 is provided at the two longitudinal sides of the foldable top 1, by means of which length changes of the top cover 3 conditioned on manufacture and/or weather can be compensated.

Each tensioning arrangement 12 includes a draw device 13 which, according to FIG. 2, is formed by a non-stretchable tensioning cable. The draw device 13 is arranged over an essential part of the longitudinal extent of the foldable top 1 inside of a loop-shaped longitudinal edge 14 of the top cover 3. The loop-shaped longitudinal edge 14 is composed of two plys or plaits which are locally connected with each other by way of stitched seams.

A deflection element 15 with a tubular member 16 is arranged at the longitudinal girder 7 adjacent the transversely extending frame part 6, whereby the draw device 13 is guided section-wise inside of the tubular member 16. Behind the tubular member, an opening 17 is provided in the loop-shaped longitudinal edge of the top cover 3 16 through which the draw device 13 is extended. The plate-shaped deflection element 15 is mounted on the sheet metal stamping 8 and is held in position by means of a fastening bolt 18 which is screwed into a welded-on nut 19 securely connected with the sheet metal stamping 8 (FIG. 3). The tubular member 16 extends approximately in parallel to a center longitudinal plane.

Figure 4:
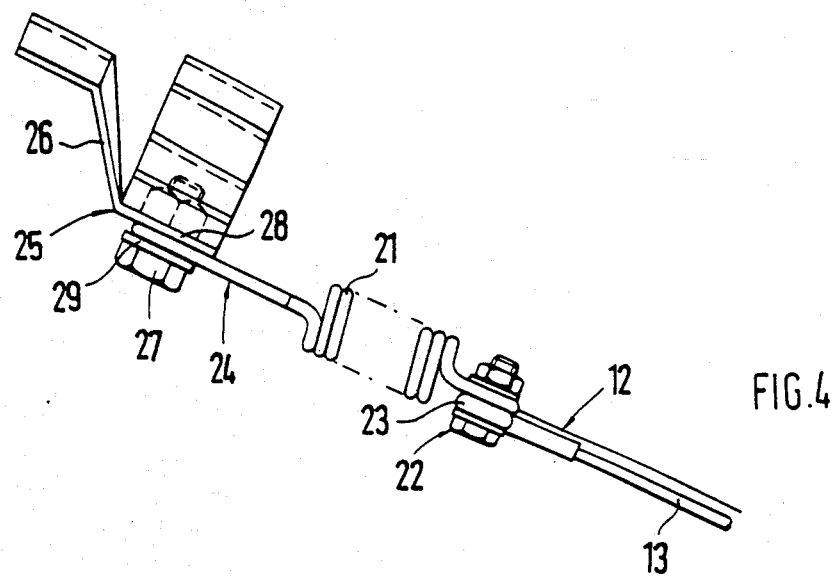
FIG. 4 is an elevational view, taken in the direction of arrow R of FIG. 2, on an enlarged scale.

After the deflection element 15, the draw device 13 extends obliquely inwardly and cooperates with its free end 20 with a draw spring 21. The draw spring 21, on the one hand, is connected by way of a threaded connection 22 (fastening bolt and nut) with an end-face eyelet 23 (FIG. 4) of the draw device 13 and, on the other, is anchored by means of a U-shaped bent end section 24 at an abutment 25. The abutment 25 securely connected with the transversely extending frame part 6 includes a retaining plate 26 on which is provided a vertically aligned bolt 27 for the suspension of the draw spring 21. The engaged end of the draw spring 21 is securely clamped-in between a flange 28 of the retaining plate 26 and a washer 29 abutting at the bolt head.

Figure 6:
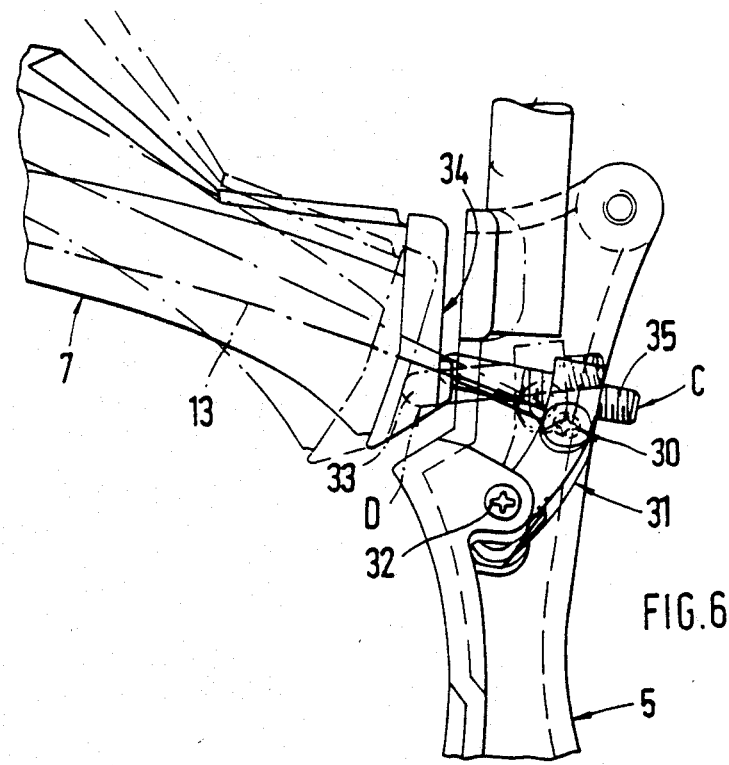
FIG. 6 is a partial elevational view of the detail X of FIG. 1, on an enlarged scale.
Figure 7:
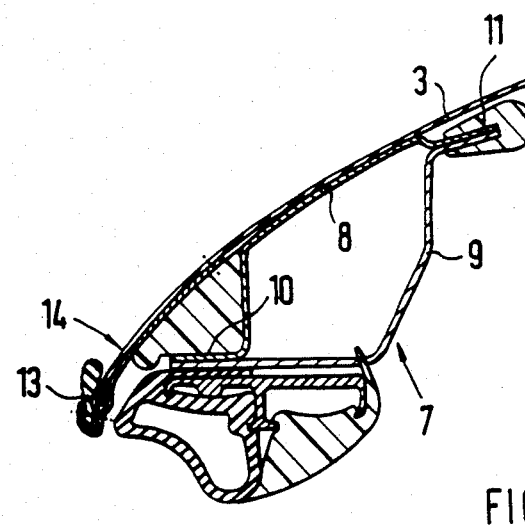
FIG. 7 is a cross-sectional view, taken along line VII—VII of FIG. 1, on an enlarged scale.

The end 30 of the draw device 13 facing the main support member 5 also protrudes section-wise out of an opening (not shown) of the loop-shaped longitudinal edge 14 of the top cover 3 and is securely connected with a pivot lever 31. The pivot lever 31 arranged at the main support member 5 in a laterally outwardly disposed area is pivotally connected at the main support member 5 by means of a shaft 32. The shaft 32 of the pivot lever 31 is located below the longitudinal girder 7. The pivot lever 31 has a bent or angularly shaped configuration, as viewed in side view. A pressure bolt 35 (FIG. 6) is arranged at the upper end of the pivot lever 31 which is aligned approximately at right angle to the pivot lever 31. The pressure bolt 35 is supported by means of a spherically shaped area 33 at a rear end 34 of the adjoining longitudinal girder 7. The fastening of the rear end 30 of the draw device 13 is provided underneath the pressure bolt 35.

Figure 5:
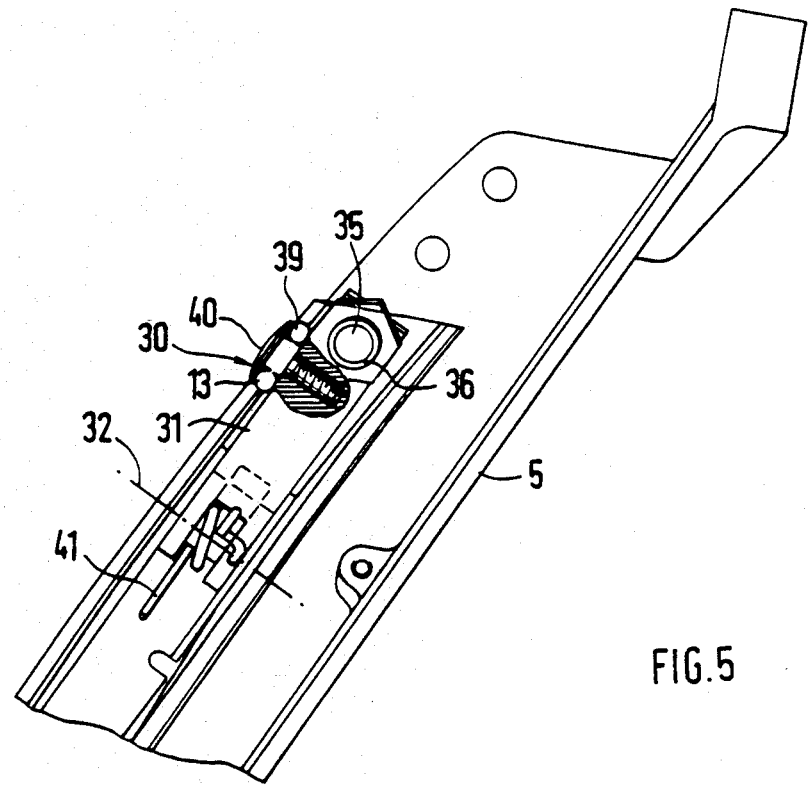
FIG. 5 is an elevational view in the direction of arrow S of FIG. 1, on an enlarged scale.

The pressure bolt 35 is screwed into a threaded bore 36 (FIG. 5) of the pivot lever 31 and is constructed adjustable, as viewed in the longitudinal direction. According to FIG. 6, the pressure bolt 35 extends beyond the pivot lever 31 both in the forward as also in the rearward direction whereby a nut can be mounted over the rear area which is supported at the pivot lever 31. The rear end 30 of the draw device 13 is constructed as eyelet 39 which is secured at a lateral outer surface of the pivot lever 31 by means of a bolt 40. The spring element 41 cooperating with the pivot lever 31 urges the pivot lever counter-clockwise in the direction of the longitudinal girder 7.

The tensioning arrangement 12 has the following function:

During the lowering of the foldable top 1 from an intermediate position B, shown in dash line, into a closing position A, the pressure bolt 31 cooperates with a rear end 34 of the longitudinal girder 7, and the pivot lever 31 is displaced rearwardly into a position C (FIG. 6) against the spring element 41, as a result of which the draw device 13, the draw spring 21 and the top cover 3 are tensioned. The top cover 3 has its maximum tension in the closed position A of the foldable top 1 so that the noises occurring during the driving operation are considerably reduced.

When pivoting up the foldable top 1, the pressure bolt 35 deflects forwardly into a position D. As a result thereof, the draw device 13, the draw spring 21 and the top cover 3 are unstressed so that the opening of the foldable top 1 is facilitated.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A tensioning arrangement for a foldable top cover of a motor vehicle, comprising draw means extending through loop-shaped longitudinal edges of the foldable top cover, said draw means being operatively connected with a forward transversely extending frame means of the foldable top cover by a draw spring and with a rear pivotal support means of the foldable top cover at its other end by a spring-loaded foldable pivot lever means, whereby in a closing position of the foldable top, a pressure bolt means arranged at the pivot lever means is supported at a free end of a laterally positioned longitudinal extending girder of the foldable top and tensions the draw spring means by way of the draw means to tension the foldable top cover means of the motor vehicle.

2. A tensioning arrangement according to claim 1, wherein the draw spring means is arranged at the end of the foldable top facing the transversely extending frame means.

3. A tensioning arrangement according to claim 2, wherein one end of the draw spring means is suspended at an abutment means secured at the frame means.

4. A tensioning arrangement according to claim 3, wherein the other end of the draw spring means is connected by a threaded connection with an end-face eye means of the draw means.

5. A tensioning arrangement according to claim 1, wherein the draw means locally cooperates with a deflection means arranged at the longitudinal girder.

6. A tensioning arrangement according to claim 5, wherein the draw means is extended through a tubular member of the deflection means.

7. A tensioning arrangement according to claim 1, wherein the pivot lever means is rotatably supported at its lower end at the pivotal support means.

8. A tensioning arrangement according to claim 7, wherein the pivotal support means is the main support member of the foldable top cover.

9. A tensioning arrangement according to claim 1, wherein the pressure bolt means is arranged in the upper area of the pivot lever means and is arranged approximately at right angle to the same.

10. A tensioning arrangement according to claim 1, wherein the pressure bolt means is constructed adjustable, as viewed in the longitudinal direction.

11. A tensioning arrangement according to claim 1, wherein the end of the draw means facing the pivot lever means is connected to the pivot lever means underneath the pressure bolt means.

12. A tensioning arrangement according to claim 1, wherein the pivot lever means is displaced by a spring element counterclockwise toward the longitudinal girder.

13. A tensioning arrangement according to claim 3, wherein the draw means extends obliquely inwardly to the abutment means forwardly of the deflection means.

14. A tensioning arrangement according to claim 1, wherein one end of the draw spring means is suspended at an abutment means secured at the frame means.

15. A tensioning arrangement according to claim 14, wherein the other end of the draw spring means is connected by a threaded connection with an end-face eye means of the draw means.

16. A tensioning arrangement according to claim 15, wherein the draw means locally cooperates with a deflection means arranged at the longitudinal girder.

17. A tensioning arrangement according to claim 16, wherein the draw means is extended through a tubular member of the deflection means.

18. A tensioning arrangement according to claim 17, wherein the draw means extends obliquely inwardly to the abutment means forwardly of the deflection means.

19. A tensioning arrangement according to claim 16, wherein the pivot lever means is displaced by a spring element counterclockwise toward the longitudinal girder.

20. A tensioning arrangement according to claim 1, wherein an end of the draw spring means is connected by a threaded connection with an end-face eye means of the draw means.

* * * * *